United States Patent
Morinaga et al.

(10) Patent No.: US 8,702,472 B2
(45) Date of Patent: Apr. 22, 2014

(54) POLISHING COMPOSITION AND POLISHING METHOD USING THE SAME

(75) Inventors: Hitoshi Morinaga, Ichinomiya (JP); Kazusei Tamai, Inazawa (JP); Hiroshi Asano, Kakamigahara (JP)

(73) Assignee: Fujimi Incorporated, Kiyosu-shi (JP)

( * ) Notice: Subject to any disclaimer, the term of this patent is extended or adjusted under 35 U.S.C. 154(b) by 475 days.

(21) Appl. No.: 13/042,648

(22) Filed: Mar. 8, 2011

(65) Prior Publication Data

US 2012/0142258 A1 Jun. 7, 2012

(30) Foreign Application Priority Data

Mar. 10, 2010 (JP) ................................. 2010-053529

(51) Int. Cl.
*B24B 1/00* (2006.01)

(52) U.S. Cl.
USPC .............. 451/36; 451/41; 438/692; 438/693; 257/E21.23

(58) Field of Classification Search
USPC .......... 451/36, 41, 63, 285, 287, 288; 51/298, 51/307; 438/692, 693; 257/E21.214, 257/E21.23
See application file for complete search history.

(56) References Cited

U.S. PATENT DOCUMENTS

| | | | |
|---|---|---|---|
| 6,022,400 A * | 2/2000 | Izumi et al. ........................ 106/3 |
| 6,098,638 A * | 8/2000 | Miyashita et al. .............. 134/1.3 |
| 6,221,118 B1 | 4/2001 | Yoshida et al. |
| 6,274,059 B1 | 8/2001 | Krusell et al. |
| 6,863,700 B2 | 3/2005 | Yoshida et al. |
| 7,022,255 B2 * | 4/2006 | Siddiqui et al. ............... 252/79.1 |
| 7,338,905 B2 * | 3/2008 | Shirasu et al. ................. 438/692 |
| 7,708,788 B2 | 5/2010 | Yoshida et al. |
| 2005/0079718 A1 * | 4/2005 | Siddiqui et al. ............... 438/692 |
| 2008/0119050 A1 * | 5/2008 | Shirasu et al. ................. 438/692 |
| 2008/0308132 A1 | 12/2008 | Tomita et al. |
| 2008/0318434 A1 | 12/2008 | Andreas |
| 2009/0314744 A1 | 12/2009 | Vacassy et al. |
| 2010/0001229 A1 * | 1/2010 | Nakagawa et al. .......... 252/79.1 |
| 2010/0081281 A1 * | 4/2010 | Babu et al. ..................... 438/693 |
| 2011/0183581 A1 * | 7/2011 | Otsu et al. ........................ 451/36 |
| 2013/0122705 A1 * | 5/2013 | Babu et al. ..................... 438/693 |

FOREIGN PATENT DOCUMENTS

| | | |
|---|---|---|
| EP | 1 610 366 A1 | 12/2005 |
| JP | 08-107094 | 4/1996 |
| JP | 09-134899 | 5/1997 |

* cited by examiner

*Primary Examiner* — Eileen P. Morgan

(74) *Attorney, Agent, or Firm* — Vidas, Arrett & Steinkraus

(57) ABSTRACT

A polishing composition contains at least abrasive grains and water and is used in polishing an object to be polished. The abrasive grains are selected so as to satisfy the relationship $X1 \times Y1 \leq 0$ and the relationship $X2 \times Y2 > 0$, where $X1$ [mV] represents the zeta potential of the abrasive grains measured during polishing of the object by using the polishing composition, $Y1$ [mV] represents the zeta potential of the object measured during polishing of the object by using the polishing composition, $X2$ [mV] represents the zeta potential of the abrasive grains measured during washing of the object after polishing, and $Y2$ [mV] represents the zeta potential of the object measured during washing of the object after polishing. The abrasive grains are preferably of silicon oxide, aluminum oxide, cerium oxide, zirconium oxide, silicon carbide, or diamond. The object is preferably of a nickel-containing alloy, silicon oxide, or aluminum oxide.

10 Claims, No Drawings

POLISHING COMPOSITION AND POLISHING METHOD USING THE SAME

BACKGROUND OF THE INVENTION

The present invention relates to a polishing composition for use in a series of steps of polishing an object to be polished and washing the object after polishing.

When an object to be polished is polished using a polishing composition containing abrasive grains, the abrasive grains occasionally attach to and remain on the polished surface of the object. Accordingly, in order to remove abrasive grains remaining on the polished surface of the object, the object after polishing is commonly washed.

Efficient removal of abrasive grains remaining on the polished surface of the object by washing can be achieved by making the abrasive grains electrostatically repel from the object, as described, for example, in Japanese Laid-Open Patent Publication No. 8-107094 and Japanese Laid-Open Patent Publication No. 9-134899. However, when abrasive grains contained in a polishing composition are electrostatically repelled from an object to be polished during polishing using the polishing composition, there is difficulty in mechanically polishing the object with the abrasive grains. As a result, it is difficult to polish the object at an enhanced rate of polishing using the polishing composition.

SUMMARY OF THE INVENTION

Accordingly, it is an objective of the present invention is to provide a polishing composition capable of polishing an object to be polished at an enhanced rate of polishing and efficiently removing, by washing, abrasive grains that attach to and remain on a polished surface of the object after polishing using the polishing composition, and a method of polishing using the composition.

In order to achieve the foregoing objective, and in accordance with a first aspect of the present invention, a polishing composition containing at least abrasive grains and water is provided. After an object to be polished is polished using the polishing composition, the object after polishing is washed to remove abrasive grains that attach to and remain on a polished surface of the object after polishing. The abrasive grains contained in the polishing composition are selected so as to satisfy the relationship $X1 \times Y1 \leq 0$ and the relationship $X2 \times Y2 > 0$, where X1 [mV] represents the zeta potential of the abrasive grains measured during polishing of the object by using the polishing composition, Y1 [mV] represents the zeta potential of the object measured during polishing of the object by using the polishing composition, X2 [mV] represents the zeta potential of the abrasive grains measured during washing of the object after polishing, and Y2 [mV] represents the zeta potential of the object measured during washing of the object after polishing.

The abrasive grains are preferably formed of silicon oxide, aluminum oxide, cerium oxide, zirconium oxide, silicon carbide, or diamond. The object is preferably formed of a nickel-containing alloy, silicon oxide, or aluminum oxide. The object after polishing using the polishing composition is washed, for example, with water or alkali solution. The polishing composition further contains a pH adjuster or a substance that adsorbs to the object to be polished. The abrasive grains may be surface-reformed.

In accordance with a second aspect of the present invention, provided is a method of polishing an object to be polished by using the polishing composition according to the above first aspect.

Other aspects and advantages of the invention will become apparent from the following description illustrating by way of example the principles of the invention.

DETAILED DESCRIPTION OF THE PREFERRED EMBODIMENTS

An embodiment of the present invention is described below.

A polishing composition of the present embodiment contains at least abrasive grains and water. The polishing composition is used mainly in polishing an object to be polished formed of an electronic device material such as a semiconductor device material, a magnetic recording device material, a light-emitting device material, and a display material, more specifically in polishing an object to be polished formed of silicon, silicon oxide, a nickel-containing alloy such as nickel-phosphorus, nickel-chromium, and nickel-iron (permalloy), or aluminum oxide such as sapphire.

After an object to be polished is polished using the polishing composition, the object after polishing is washed to remove abrasive grains that attach to and remain on a polished surface of the object after polishing. Preferably, water such as pure water or ion-exchanged water or an alkali solution is used as a wash solution when the object after polishing is washed. The alkali solution has a pH of preferably not lower than 9, more preferably not lower than 10. The washing may be performed with a washer for exclusive use or with the same polishing machine used in polishing of the object by using the polishing composition. In the case of using the polishing machine for washing, the object after polishing is rinse polished by feeding the wash solution, instead of the polishing composition, to the polishing machine, specifically the object after polishing or a polishing pad in the polishing machine.

The abrasive grains contained in the polishing composition may be of, for example, silicon oxide, aluminum oxide, cerium oxide, zirconium oxide, silicon carbide, or diamond, although not limited thereto. Aluminum oxide and silicon oxide have an advantage in easy availability for readily producing a highly smooth surface having few defects by polishing using the polishing composition.

The polishing composition contains preferably not less than 0.01% by mass, more preferably not less than 0.1% by mass of the abrasive grains. The more the amount of abrasive grains contained, the more enhanced becomes the rate of polishing an object to be polished using the polishing composition.

The polishing composition contains preferably not more than 50% by mass, more preferably not more than 40% by mass of the abrasive grains. The less the amount of abrasive grains contained, the more reduced becomes the cost of manufacturing the polishing composition. In addition, a polished surface having few scratches can be more readily produced by polishing using the polishing composition.

The polishing composition contains abrasive grains having a mean primary particle diameter of preferably not smaller than 5 nm, more preferably not smaller than 10 nm. The larger the mean primary particle diameter of the abrasive grains, the more enhanced becomes the rate of polishing an object to be polished using the polishing composition.

The polishing composition contains abrasive grains having a mean primary particle diameter of preferably not larger than 20 μm, more preferably not larger than 10 μm. The smaller the mean primary particle diameter of the abrasive grains, the more readily the surface having fewer defects and a small degree of roughness can be produced by polishing using the polishing composition. The mean primary particle diameter is calculated, for example, from the specific surface of the abrasive grains measured by the BET method. The specific surface of the abrasive grains is measured, for example, with a "Flow SorbII 2300" made by Micromeritics Instrument Corporation.

In order to polish an object to be polished at an enhanced rate of polishing using the polishing composition, it is important that the abrasive grains contained in the polishing composition are not electrostatically repelled from the object during polishing. Accordingly, the abrasive grains contained in the polishing composition are selected so as to satisfy the relationship $X1 \times Y1 \leq 0$, where X1 [mV] represents the zeta potential of the abrasive grains measured during polishing of the object by using the polishing composition and Y1 [mV] represents the zeta potential of the object measured during polishing of the object by using the polishing composition. When the relationship $X1 \times Y1 \leq 0$ is not satisfied, that is, when the relationship $X1 \times Y1 > 0$ is satisfied, the abrasive grains contained in the polishing composition are electrostatically repelled from the object during polishing, which creates difficulty in mechanically polishing the object with the abrasive grains. As a result, it is difficult to polish the object at an enhanced rate of polishing using the polishing composition. The expression $X1 \times Y1$ has a value preferably not higher than $-20$ for enhancing the rate of polishing an object to be polished to a level particularly suitable for practical use with the polishing composition.

The expression $X1 \times Y1$ has a value of preferably not lower than $-5,000$, and more preferably not lower than $-2,000$. The higher the value of the expression $X1 \times Y1$, the more readily the abrasive grains attaching to the polished surface of the object can be removed by washing.

In order to efficiently remove, by washing, abrasive grains that attach to and remain on a polished surface of the object after polishing using the polishing composition it is important that the abrasive grains be electrostatically repelled from the object during washing. Accordingly, the abrasive grains for use are selected so as to satisfy the relationship $X2 \times Y2 > 0$, where X2 [mV] represents the zeta potential of the abrasive grains measured during washing of the object after polishing and Y2 [mV] represents the zeta potential of the object measured during washing of the object after polishing. When the relationship $X2 \times Y2 > 0$ is not satisfied, that is, when the relationship $X2 \times Y2 \leq 0$ is satisfied, the abrasive grains remaining on the polished surface of the object after polishing using the polishing composition are not electrostatically repelled from the object during washing of the object after polishing, which creates difficulty in efficiently removing, by washing, the abrasive grains remaining on the polished surface of the object after polishing using the polishing composition.

The zeta potential value of the abrasive grains measured during polishing of the object by using the polishing composition and the zeta potential value of the object measured during polishing of the object by using the polishing composition are affected, for example, by the pH of the polishing composition. Accordingly, the relationship $X1 \times Y1 \leq 0$, preferably the relationship $X1 \times Y1 \leq -20$ may be satisfied with addition of one or more pH adjusters to the polishing composition. The pH adjuster for use may be either acid or alkali.

Alternatively, with addition of an adsorptive substance to the polishing composition, the zeta potential value of the object measured during polishing of the object by using the polishing composition is varied with the substance adsorbed to the surface of the object to be polished. Accordingly, the relationship $X1 \times Y1 \leq 0$, preferably the relationship $X1 \times Y1 \leq -20$ may be satisfied with addition of such an adsorptive substance to the polishing composition. The adsorptive substance for use is preferably appropriately selected depending on the types of objects to be polished, and may be, for example, an anionic, cationic, nonionic, or zwitterionic surfactant, an organic matter, or metal ions.

Alternatively, in order to satisfy the relationship $X1 \times Y1 \leq 0$, preferably $X1 \times Y1 \leq -20$, as well as the relationship $X2 \times Y2 > 0$, the zeta potential of the abrasive grains may be adjusted by reforming the surface of the abrasive grains with doping or organic functional group modification.

The zeta potential values of the abrasive grains and the object are measured by an electrophoretic light scattering method or electroacoustic spectroscopy using, for example, an "ELS-Z" made by Otsuka Electronics Co., Ltd. or a "DT-1200" made by Dispersion Technology Inc. Measurement of the zeta potential of the object may be replaced with measurement of the zeta potential of fine particles composed of the same material as the object. Alternatively, the object is immersed in a liquid containing fine particles having a known zeta potential value, taken out from the liquid, and washed with running water for about 10 seconds, and then the surface of the object may be observed with, for example, a scanning electron microscope. In this case, whether a sign of the zeta potential value of the object measured in the liquid is positive or negative can be known from the amount of the fine particles attaching to the surface of the object to be polished after washing.

The present embodiment provides the following advantages.

The abrasive grains contained in the polishing composition of the present embodiment are selected so as to satisfy the relationship $X1 \times Y1 \leq 0$ and the relationship $X2 \times Y2 > 0$, where X1 [mV] represents the zeta potential of the abrasive grains measured during polishing of the object by using the polishing composition, Y1 [mV] represents the zeta potential of the object measured during polishing of the object by using the polishing composition, X2 [mV] represents the zeta potential of the abrasive grains measured during washing of the object after polishing, and Y2 [mV] represents the zeta potential of the object measured during washing of the object after polishing. Accordingly, the abrasive grains for use are not electrostatically repelled from the object during polishing of the object by using the polishing composition, while electrostatically repelled from the object during washing of the object after polishing. Since the abrasive grains contained in the polishing composition are not electrostatically repelled from the object during polishing of the object by using the polishing composition, mechanical polishing of the object is efficiently performed with the abrasive grains. In addition, since the abrasive grains remaining on the polished surface of the object are electrostatically repelled from the object during washing of the object after polishing, the abrasive grains are efficiently removed from the object after polishing using the polishing composition. As a result, using the polishing composition of the present embodiment, an object to be polished can be polished at an enhanced rate of polishing and abrasive grains that attach to and remain on a polished surface of the object after polishing using the polishing composition can be efficiently removed by washing.

The embodiment may be modified as described below.

The polishing composition of the embodiment may contain two or more kinds of abrasive grains. In this case, a part of the abrasive grains does not need to be selected so as to satisfy the relationships $X1 \times Y1 \leq 0$ and $X2 \times Y2 > 0$. However, in order to achieve a more enhanced rate of polishing and more efficient washing, preferably entire abrasive grains are selected to satisfy the relationships $X1 \times Y1 \leq 0$ and $X2 \times Y2 > 0$.

The polishing composition of the embodiment may further contain a known additive such as an antiseptic as needed.

The polishing composition of the embodiment may be prepared by diluting a concentrate of the polishing composition with water.

The polishing composition of the embodiment may be used not only for polishing objects to be polished formed of electronic device material but also for polishing other objects to be polished.

Examples and Comparative Examples of the present invention will now be described below.

Examples 1 and 2 and Comparative Example 1

Polishing compositions of Examples 1 and 2 and Comparative Example 1 were prepared by diluting a colloidal silica sol containing colloidal silica having a mean primary particle diameter of 80 nm with water and adding a pH adjuster as needed. Each of the polishing compositions of Examples 1 and 2 and Comparative Example 1 contained 20% by mass of colloidal silica. Hydrochloric acid or potassium hydroxide was appropriately used as a pH adjuster. Using each polishing composition of Examples 1 and 2 and Comparative Example 1, a surface (c-plane (<0001>)) of a sapphire substrate was polished under the conditions shown in Table 1. All the sapphire substrates were of the same kind having a diameter of 52 mm (about 2 inch). Subsequently, the polished sapphire substrates were washed under the conditions shown in Table 2. The washing was performed by rinse polishing with potassium hydroxide solution adjusted to pH 10 using the same polishing machine used in the preceding polishing.

In Table 3, the pHs of the polishing compositions, the zeta potentials of the colloidal silica and the sapphire substrates measured during polishing, and the zeta potentials of the colloidal silica and the sapphire substrates measured during washing are shown. The weights of the sapphire substrates were measured before and after polishing using the polishing compositions for calculation of the rates of polishing from the difference in weights before and after polishing. The calculated rates of polishing are shown in the column "polishing rate" of Table 3. The surface of the sapphire substrates after washing were observed at 50,000 power magnification with a scanning electron microscope "S-4700" made by Hitachi High-Technologies Corporation. The results of evaluation are shown in the column "washing efficiency" of Table 3, where the rating "good" means not more than 50 pieces of abrasive grain remaining on the substrate surface were observed in the field of view, while the rating "no good" means more than 50 pieces.

TABLE 1

<Sapphire substrate polishing conditions>

Polishing machine: Single side polisher "EJ-380IN" (surface plate diameter of 380 mm) made by Engis Japan Corporation
Polishing pad: Nonwoven fabric polishing pad "SUBA800" made by Nitta Haas Incorporated
Polishing pressure: 300 g/cm² (29.4 kPa)
Surface plate rotational rate: 110 rpm
Linear velocity: 83 m/min
Polishing time: 5 min
Polishing composition feed rate: 200 mL/min (continuously fed without being circulated)

TABLE 2

<Sapphire substrate washing conditions>

Polishing machine: Single side polisher "EJ-380IN" (surface plate diameter of 380 mm) made by Engis Japan Corporation
Polishing pad: Nonwoven fabric polishing pad "SUBA800" made by Nitta Haas Incorporated
Polishing pressure: 300 g/cm² (29.4 kPa)
Surface plate rotational rate: 110 rpm
Linear velocity: 83 m/min
Washing time: 5 min
Washing solution feed rate: 200 mL/min (continuously fed without being circulated)

TABLE 3

| | pH of polishing composition | Zeta potential (X1) [mV] of colloidal silica measured during polishing | Zeta potential (Y1) [mV] of sapphire substrate measured during polishing | X1 × Y1 (product of X1 and Y1) | Zeta potential (X2) [mV] of colloidal silica measured during washing | Zeta potential (Y2) [mV] of sapphire substrate measured during washing | X2 × Y2 (product of X2 and Y2) | Polishing rate [nm/min] | Washing efficiency |
|---|---|---|---|---|---|---|---|---|---|
| Example 1 | 6 | −41 | 43 | −1763 | −41 | −41 | 1681 | 38 | Good |
| Example 2 | 8 | −52 | 10 | −520 | −41 | −41 | 1681 | 40 | Good |
| Comparative Example 1 | 10.5 | −48 | −48 | 2304 | −41 | −41 | 1681 | 28 | Good |

As shown in Table 3, when a sapphire substrate was polished using the polishing composition of Example 1 or 2, the sign of the product of the zeta potential of the abrasive grains and the zeta potential of the substrate measured during polishing was negative, while the sign of the product of the zeta potential of the abrasive grains and the zeta potential of the substrate measured during washing was positive. In contrast, when a sapphire substrate was polished using the polishing composition of Comparative Example 1, the sign of the product of the zeta potential of the abrasive grains and the zeta potential of the substrate measured during polishing was positive. Consequently, a higher polishing rate was achieved using the polishing composition of Example 1 or 2 compared to using the polishing composition of Comparative Example 1.

Example 3 and Comparative Example 2

Polishing compositions of Example 3 and Comparative Example 2 were prepared by blending abrasive grains and water, and subsequently adding aluminum chloride to adjust to pH 3.5. Using each of the polishing compositions, the surface of an electroless nickel-phosphorus plated substrate for a magnetic disc was polished under the conditions shown in Table 4. All the nickel-phosphorus plated substrates used were of the same kind having a diameter of 95 mm (about 3.5 inches). Subsequently, the polished nickel-phosphorus plated substrates were washed under the conditions shown in Table 5. The washing was performed by rinse polishing with pure water using the same polishing machine used in the preceding polishing.

In Table 6, the type and content of the abrasive grains contained in each of the polishing compositions, the sign of the zeta potential of the abrasive grains and the sign of the zeta potential of the substrate measured during polishing of the substrate by using each of the polishing composition, and the sign of the zeta potential of the abrasive grains and the sign of the zeta potential of the substrate measured during washing of the substrate after polishing using each of the polishing composition are shown. The weights of the nickel-phosphorus plated substrates were measured before and after polishing using the polishing compositions for calculation of the rates of polishing from the difference in weights before and after polishing. The calculated rates of polishing are shown in the column "polishing rate" of Table 6. The surfaces of the nickel-phosphorus plated substrates after washing were observed at 50,000 power magnification with a scanning electron microscope "S-4700" made by Hitachi High-Technologies Corporation. The results of evaluation are shown in the column "washing efficiency" of Table 6, where the rating "good" means not more than 50 pieces of abrasive grain remaining on the substrate surface were observed in the field of view, while the rating "no good" means more than 50 pieces.

TABLE 4

<Nickel-phosphorus plated substrate polishing conditions>

Polishing machine: Double side polisher "9.5B_5P" made by System Seiko Co., Ltd.
Polishing pad: Suede polishing pad "CR200" made by Filwel Co., Ltd.
Polishing pressure: 55 g/cm$^2$ (5.4 kPa)
Upper surface plate rotational rate: 36 rpm
Lower surface plate rotational rate:: 44 rpm
Polishing time: 3 min
Polishing composition feed rate: 270 mL/min

TABLE 5

<Nickel-phosphorus plated substrate washing conditions>

Polishing machine: Double side polisher "9.5B_5P" made by System Seiko Co., Ltd.
Polishing pad: Suede polishing pad "CR200" made by Filwel Co., Ltd.
Polishing pressure: 20 g/cm$^2$ (2.0 kPa)
Upper surface plate rotational rate: 36 rpm
Lower surface plate rotational rate: 44 rpm
Washing time: 15 sec
Pure water feed rate: 2.8 L/min

TABLE 6

| | Type of abrasive grains in polishing composition | Content of abrasive grains in polishing composition [% by mass] | Sign of zeta potential (X1) of abrasive grains measured during polishing | Sign of zeta potential (Y1) of substrate measured during polishing | Sign of X1 × Y1 (product of X1 and Y1) | Sign of zeta potential (X2) of abrasive grains measured during washing | Sign of zeta potential (Y2) of substrate measured during washing | Sign of X2 × Y2 (product of X2 and Y2) | Polishing rate [nm/min] | Washing efficiency |
|---|---|---|---|---|---|---|---|---|---|---|
| Example 3 | Hexahedral alumina | 1.5 | + | − | − | − | − | + | 780 | Good |
| Comparative Example 2 | Amorphous alumina | 5 | + | − | − | + | − | − | 780 | No good |

* Both of hexahedral alumina and amorphous alumina have an average particle size of 200 nm.

As shown in Table 6, when a nickel-phosphorus plated substrate was polished using the polishing composition of Example 3, the product of the zeta potential of abrasive grains and the zeta potential of the substrate had a negative sign during polishing and had a positive sign during washing. In contrast, when a nickel-phosphorus plated substrate was polished using the polishing composition of Comparative Example 2, the product of the zeta potential of abrasive grains and the zeta potential of the substrate had a negative sign during washing. Consequently, a higher washing efficiency was achieved using the polishing composition of Example 3 compared to using the polishing composition of Comparative Example 2.

The invention claimed is:

1. A method of polishing an object to be polished, the method comprising:
    preparing a polishing composition containing at least abrasive grains and water;
    using the polishing composition to polish the object; and
    washing the object after polishing to remove abrasive grains that attach to and remain on a polished surface of the object after polishing,
    wherein the relationship X1×Y1≤0 and the relationship X2×Y2>0 are satisfied, where X1 [mV] represents the zeta potential of the abrasive grains measured during polishing of the object by using the polishing composition, Y1 [mV] represents the zeta potential of the object measured during polishing of the object by using the polishing composition, X2 [mV] represents the zeta potential of the abrasive grains measured during washing of the object after polishing, and Y2 [mV] represents the zeta potential of the object measured during washing of the object after polishing.

2. The method according to claim 1, wherein the object after polishing using the polishing composition is washed through rinse polishing using the same polishing machine used in the polishing.

3. The method according to claim 1, wherein the abrasive grains are formed of silicon oxide, aluminum oxide, cerium oxide, zirconium oxide, silicon carbide, or diamond.

4. The method according to claim 1, wherein the object is formed of a nickel-containing alloy, silicon oxide, or aluminum oxide.

5. The method according to claim 1, wherein the object after polishing using the polishing composition is washed with water or alkali solution.

6. The method according to claim 1, further comprising adding a pH adjuster to the polishing composition prior to said using.

7. The method according to claim 1, further comprising adding a substance that adsorbs to the object to the polishing composition prior to said using.

8. The method according to claim 1, wherein said preparing a polishing composition includes surface-reforming the abrasive grains.

9. A method of polishing an object to be polished, the method comprising:

preparing a polishing composition containing at least abrasive grains and water;

using the polishing composition to polish the object; and washing, using a washing solution, the object after polishing to remove abrasive grains that attach to and remain on a polished surface of the object after polishing, wherein the preparing a polishing composition includes selecting the abrasive grains used in the polishing composition from the group consisting of silicon oxide, aluminum oxide, cerium oxide, zirconium oxide, silicon carbide, and diamond so as to satisfy the relationship $X \times Y \leq 0$ under the conditions during polishing of the object by using the polishing composition and the relationship $X \times Y > 0$ under the conditions during washing of the object by using the wash solution, where $X$ [mV] represents the zeta potential of the abrasive grains and $Y$ [mV] represents the zeta potential of the object.

10. The method according to claim 9, wherein the object is formed of a nickel-containing alloy, silicon, silicon oxide, or aluminum oxide.

* * * * *